United States Patent [19]
Servati

[11] Patent Number: 5,408,972
[45] Date of Patent: Apr. 25, 1995

[54] FUEL INJECTOR CONTROL INCORPORATING FUEL VAPORIZATION PARAMETERS

[75] Inventor: Hamid B. Servati, Farmington Hills, Mich.

[73] Assignee: Ford Motor Company, Dearborn, Mich.

[21] Appl. No.: 82,565

[22] Filed: Jun. 28, 1993

[51] Int. Cl.⁶ .......................................... F02M 51/00
[52] U.S. Cl. ................................................ 123/478
[58] Field of Search ............... 123/478, 684, 492, 493, 123/480, 682; 364/431.08

[56] References Cited

U.S. PATENT DOCUMENTS

| | | | |
|---|---|---|---|
| 5,190,020 | 3/1993 | Cho | 123/684 |
| 5,215,061 | 6/1993 | Ogawa et al. | 123/478 |
| 5,257,607 | 11/1993 | Gillespie | 123/478 |
| 5,263,455 | 11/1993 | Iwai et al. | 123/478 |
| 5,278,762 | 1/1994 | Kawamura | 364/431.08 |

OTHER PUBLICATIONS

"Spray/Wall Interactions Simulation", by H. Servati et al., SAE Technical Paper #890566, International Congress and Exposition, Detroit Mich., Feb. 27–Mar. 3, 1989, 9 pgs.

Primary Examiner—Raymond A. Nelli
Attorney, Agent, or Firm—Roger L. May; Peter Abolins

[57] ABSTRACT

A fuel injector control apparatus and system of controlling fuel injector operation is disclosed. The control utilizes signals representative of fuel vaporization parameters including conductive and convective fuel flow characteristics. In particular, the presence of liquid fuel on the walls of an intake port which fails to vaporize upon injection is compensated for by the fuel injector control. Algorithms are utilized for controlling fuel injection based upon the convective fuel vapor flow mass and the conductive fuel vaporization rate.

2 Claims, 2 Drawing Sheets

FUEL INJECTOR CONTROL INCORPORATING FUEL VAPORIZATION PARAMETERS

TECHNICAL FIELD

The present invention relates to fuel injector controls for internal combustion engines and, more particularly, to fuel injector controls that optimize the quantity of fuel supplied based upon multiple variables.

BACKGROUND OF INVENTION

Internal combustion engines, such as those used in automobiles and trucks, are fueled by an air/fuel mixture which is combusted in cylinders. Precise control of the air/fuel mixture ratio is important to optimizing the operation of an internal combustion engine in terms of both performance and exhaust gas emissions.

Prior fuel injector controls are designed to provide precise control of the air/fuel mixture in steady state operations, preferably at a ratio of about 14.6:1. Under transient conditions, such as when the vehicle is accelerated or decelerated, the air/fuel ratio can be changed to become lean or fuel rich for a time on the order of one second or more.

It has been found that engine temperature, manifold pressures, fuel vapor pressure and engine air mass flow rates affect the degree to which air/fuel ratios deviate from ideal conditions.

Fuel injectors do not generally inject fuel directly into the combustion chamber, but instead direct fuel sprayed by a nozzle onto walls of intake ports or valve surfaces. Fuel supplied by a spray to a wall of an intake port either vaporizes or coats the wall of the intake port as a liquid which wets the wall or forms a puddle.

Ideally, all of the fuel supplied would be in the form of a vapor. However, either relatively cool temperatures of the intake port wall on initial start-up or rapid increase in fuel supplied prior to increasing engine speed results in the formation of a sizeable puddle of fuel on the intake port wall.

This phenomenon is described in applicant's prior technical paper entitled "Spray/Wall Interactions Simulation", Servati, Hamid B. and Herman, Edward W., SAE Paper No. 890566, which explains injector spray wall interactions for the purpose of optimizing injector location, design and spray patterns for improving engine performance. As explained in that paper, two phenomena are considered in fuel vaporization: (i) conductive fuel vaporization; and (ii) convective fuel vaporization.

Conductive vaporization is a function of fuel volatility wherein fuel contact on warm wall surfaces results in evaporation of lower boiling point hydrocarbons. High end hydrocarbons with low vapor pressure remain on the walls in liquid form.

Convective vaporization results from turbulent, forced convection of fuel into the air stream. Fuel properties, such as viscosity, density, diffusivity and fuel temperature as well as wall surface temperature, air flow, intake manifold pressure, charge temperature, engine speed and the area of the vaporization surface, all affect convective vaporization.

Fuel is transported into the engine cylinder in either gaseous or liquid form, the liquid form being provided by the flow of a fuel puddle on the intake port wall to the intake port.

While these phenomena have been known, dynamic utilization of this information in injector control systems has not heretofore been developed.

SUMMARY OF INVENTION

The present invention comprises an apparatus for controlling a fuel injection system of an internal combustion engine based upon a determination of the convective fuel vapor mass and conductive fuel vaporization rate.

The apparatus includes means for determining the following parameters: fuel vapor pressure, air charge temperature, engine air mass flow, fuel wetted area characteristic diameter, fuel wetted area characteristic length, manifold pressure, engine speed and puddle fuel temperature. The above parameters are processed by an engine control which receives signals representative of the above-identified factors and calculates the convective fuel vapor flow mass and conductive fuel vaporization rate. The amount of fuel injected to the engine is controlled to compensate for fuel resident on the intake port, a portion of which is subsequently vaporized and mixed with air during injection cycles.

Fuel vapor flow mass is preferably calculated according to the following formula $$\frac{(0.0050166 * VAP * \sqrt{ACT} * AM)}{(D * L * PMAN * N)}$$

where:
VAP = puddle fuel vapor pressure (in PSI)
ACT = air charge temperature (in °R.)
AM = engine air mass flow (in pounds per second)
D = fuel wetted area characteristic diameter (in feet)
L = fuel wetted area characteristic length (in feet)
PMAN = manifold pressure (in inches of Hg)
N = engine speed (in RPM).

The conductive fuel vaporization rate is preferably calculated according to the following formula:

$$\dot{M}_f * VAPFAC$$

where:
$\dot{M}_f$ = injected fuel mass rate
$T_f$ = puddle fuel temperature (in °F.)
VAPFAC = 0.002 of $T_f \leq 0$
VAPFAC = 0.0021*$T_f$ for $0 < T_f < 200$
VAPFAC = 0.003625* $T_f$ — 0.305 for $200 < T_f < 400$.

These and other objects of the present invention are achieved in accordance with the invention as will be more fully understood based upon a review of the drawings in view of the following detailed description of the best mode for carrying out the invention.

BEST MODE FOR CARRYING OUT THE INVENTION

Figure 1:
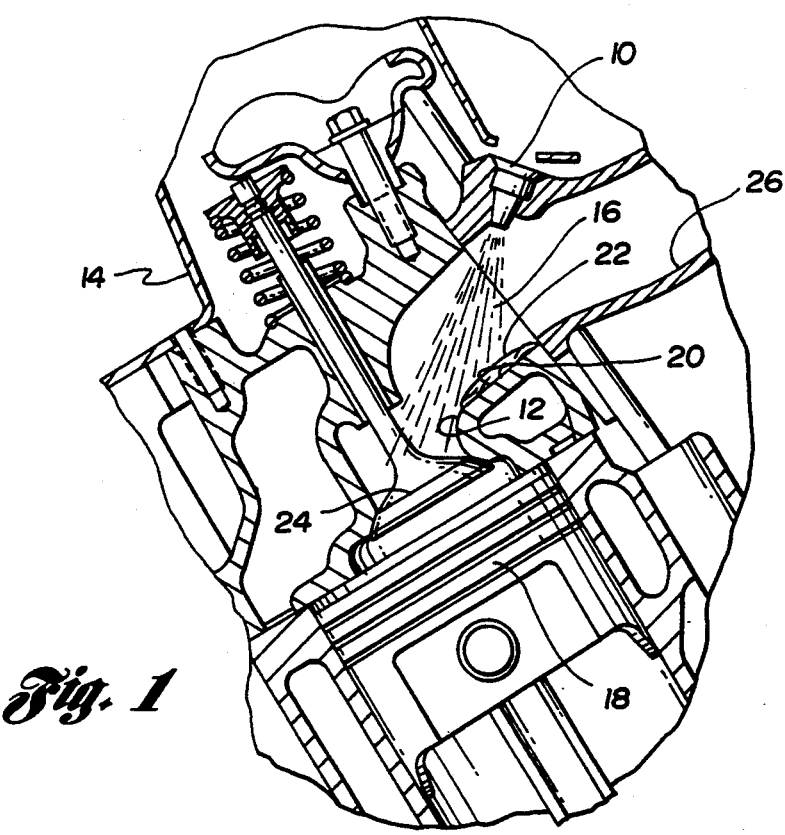
FIG. 1 is a fragmentary, cross-sectional view showing an injector delivering fuel to an intake port of a cylinder head.

Referring now to the drawings, FIG. 1 shows a fuel injector 10 and an intake port 12 of an internal combustion engine 14. The fuel injector is shown injecting fuel 16 in the area of the intake port 12 which is to be supplied to the cylinder 18 of the internal combustion engine 14. A portion of the fuel 16 is sprayed on a wall 20 where it forms a puddle 22 comprising the excess quantity of fuel 16 supplied by fuel injector 10 that is not vaporized. Fuel vapors in the fuel intake port 12 and the puddle 22 on the wall 20 are drawn toward the valve 24 during the engine cycle.

Fuel injector 10 is not a direct injection fuel injector but instead injects fuel into the intake port 12.

Figure 2:
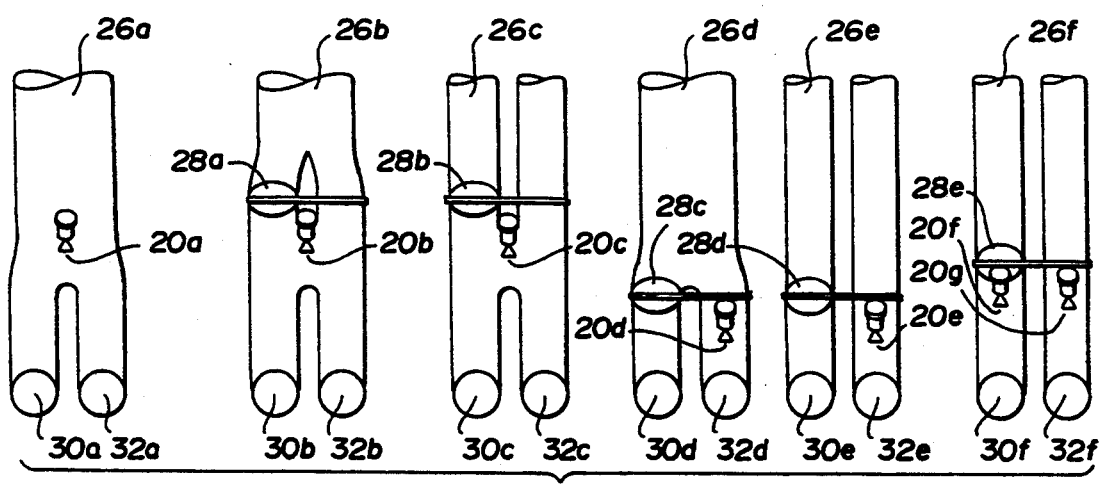
FIG. 2 is a schematic view of different intake port configurations for internal combustion engines.

Referring now to FIG. 2, six different intake manifolds 26(a)-(f) are shown wherein one or more fuel injectors are positioned in various locations. A butterfly valve 28(a)-(e) may be incorporated as part of the intake manifold assembly which is cycled to control air flow through the intake manifold 26. Fuel 16 supplied to walls 20(a)-(f) in various locations on the intake manifolds (a)-(f). Fuel 16 is supplied in the location shown and directed to intake walls 28 (a)-(f) to provide fuel to first and second intake ports 30(a)-(f), 32(a)-(f).

Depending upon the location of the fuel injector, its type and orientation, different characteristics of air and vapor flow can be projected. Other factors related to temperature, manifold pressure, air mass and fuel characteristics can be simulated and used to develop a fuel injector system which provides optimum air/fuel ratio mixtures under essentially all circumstances.

Figure 3:
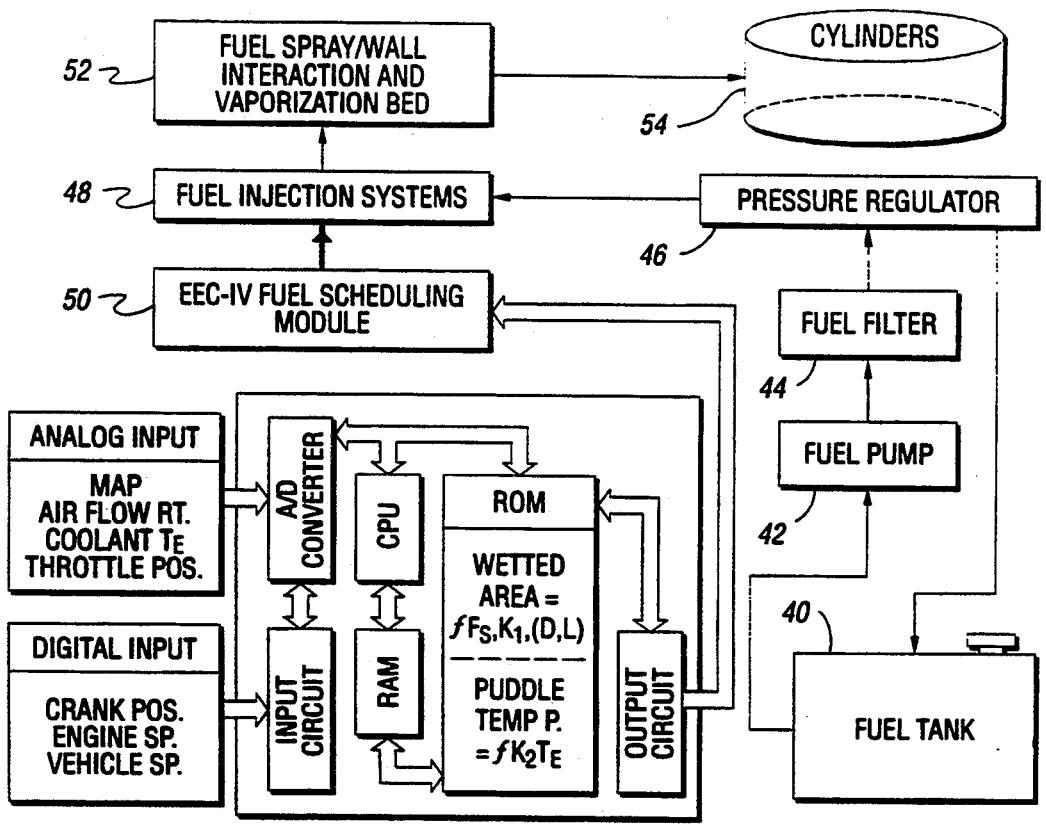
FIG. 3 is a flow chart showing a fuel path for an electronic fuel injection system.

Referring now to FIG. 3, a fuel system is shown schematically wherein fuel tank 40 provides fuel to a fuel pump 42. Fuel leaving the fuel pump 42 passes through a fuel filter 44 and into a pressure regulator 46. Fuel is supplied by the pressure regulator 46 to the fuel injection system 48. The fuel injection system 48 is controlled by an electronic microprocessor module known as EEC-IV fuel scheduling module 50. The fuel scheduling module 50 controls the timing of the fuel injection by the fuel injection system 48 so that the fuel spray/wall interaction in vaporization bed 52 is closely controlled.

According to the invention, the fuel injection system provides fuel to the fuel spray wall interaction and vaporization bed 52 so as to prevent lean air/fuel ratios during acceleration (especially at low temperatures). Lean air/fuel ratios are caused by supplying excessive amounts of fuel for a period of time which are not appropriately converted into fuel vapor but instead pass in liquid phase from the vaporization bed to the cylinders. Likewise, when decelerating, the fuel injection system is controlled by ECC-IV fuel scheduling module 50 so that the fuel puddle mass is minimized. Upon deceleration the fuel contained in the puddle is limited so that a lesser quantity of fuel is available in the puddle. This minimizes the quantity of unwanted fuel provided to the engine after it is desired to reduce the supply of fuel to the engine.

Figure 4:
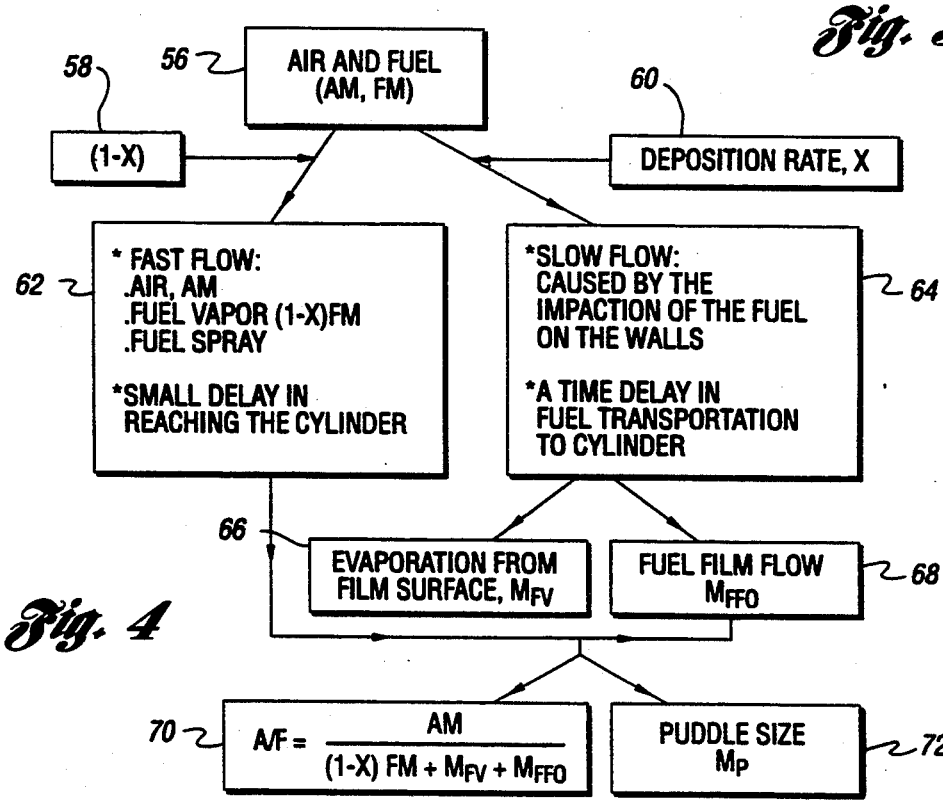
FIG. 4 is a flow chart showing fuel path after injection in an electronic fuel injection system.

Operation of the algorithm by which the ECC-IV fuel scheduling module operates will be explained by reference to FIG. 4. The air and fuel supplied to the engine is referred to as air mass $A_m$ and fuel mass $F_m$ and diagrammatically shown at reference numeral 56 and FIG. 4. A first portion represented by reference numeral 58 represents the vaporized fuel supplied to the fuel/spray wall interaction and vaporization bed. A second portion of the fuel shown at reference numeral 60 is the liquid fuel deposited on the fuel spray/wall interaction and vaporization bed. The liquid portion of the fuel is primarily composed of the low volatility portion of the fuel. As shown at reference numeral 62, the vaporized fuel 58 flows quickly to the engine and is affected by the air mass, fuel vapor pressure and fuel spray. This portion of the fuel supplied has only a small delay in reaching the cylinder. In contrast, liquid fuel 60 as shown at reference numeral 64 exhibits a slow flow characteristic, which is caused by the impaction of the liquid phase fuel on the walls of the intake manifold. A time delay (generally on the order of one to two seconds) may occur in the time required to transfer the fuel from the walls of the intake manifold to the engine cylinder.

Liquid fuel is transported in two ways to the cylinder. A portion of the liquid fuel deposited as shown at 66 evaporates from the surface of the film. This is generally characterized by the variable $M_{fv}$, which is representative of the mass of the fuel evaporation. The balance of the liquid fuel 60 is transmitted to the cylinder, as shown at reference numeral 68, as a fuel film flow represented in the control algorithm as $M_{ffo}$, which is representative of the mass of the fuel flowing as a film along the wall.

Referring to reference numeral 70, the general formula for air/fuel mixtures employed by the fuel scheduling module 50 is:

$$A/F = \frac{AM}{(1 - X) FM + M_{FV} + M_{FFO}}$$

As shown at reference numeral 72, the puddle size $M_p$, which is representative of the mass of the puddle, is also developed by the algorithm.

The specific algorithm utilized by the apparatus for controlling a fuel injection system of the present invention calculates convective fuel vapor flow mass according to the following formula:

$$\frac{(0.0050166 * VAP * \sqrt{ACT * AM})}{(D * L * PMAN * N)}$$

where:
VAP = puddle fuel vapor pressure (in PSI)
ACT = air charge temperature (in °R.)
AM = engine air mass flow (in pounds per second)
D = fuel wetted area characteristic diameter (in feet)
L = fuel wetted area characteristic length (in feet)
PMAN = manifold pressure (in inches of Hg)
N = engine speed (in RPM).

Also according to the present invention, the algorithm for calculating conductive fuel vaporization rate is as follows:

$$\dot{M}_f * VAPFAC$$

where:
$M_f$ = injected fuel flow mass rate
$T_f$ = puddle fuel temperature (in °F.)
VAPFAC = 0.002 for $T_f \leq 0$
VAPFAC = 0.0021 * $T_f$ for $0 < T_f < 200$
VAPFAC = 0.003625 * $T_f$ − 0.305 for $200 < T_f < 400$.

According to the invention, means for determining the puddle fuel vapor pressure is a sensor disposed in the intake manifold. Alternatively, the puddle fuel vapor pressure can be simulated based upon other parameters including intake manifold design and fuel characteristics.

The means for determining the air charge temperature in generating an air charge temperature signal is a thermocouple disposed in the intake manifold.

The means for determining engine air mass flow and generating engine air mass flow signal is a mass air flow sensor, also known as a MAS sensor.

The means for determining the fuel wetted area characteristic diameter in generating a fuel wetted area characteristic diameter signal is calculated based upon fuel spray and wall interaction geometry characteristics for a given intake manifold design.

The means for determining the fuel wetted area characteristic lengths and generating a fuel wetted area characteristic length signal again is based upon fuel spray parameters $F_s$ and wall interaction geometry for the intake manifold. The latter is represented by empirical test data represented by constant $K_1$ in FIG. 3.

The means for determining the manifold pressure and generating a manifold pressure signal representative thereof is preferably a vacuum gauge. Alternatively, the manifold pressure can be inferred or measured by a capacitor-capsule MAP sensor.

The means for determining engine speed and generating an engine speed signal is a tachometer which measures the revolutions per minute of the engine.

The means for determining the puddle fuel temperature and generating a puddle fuel temperature signal is a calculated value based upon the engine coolant temperature $T_E$. Empirical test data, represented by constant $K_2$ in FIG. 3, can be determined for any given engine.

The engine control means is preferably the engine control unit or ECU. The ECU receives the puddle fuel vapor pressure signal, the air charge temperature signal, the engine air mass flow signal, the fuel wetted area characteristic diameter signal, the fuel wetted area characteristic length signal, the manifold pressure signal, and the engine speed signal. The ECU then utilizes the above formula for calculating the convective fuel vapor flow mass according to the above formula. The ECU also calculates the conductive fuel vaporization rate according to the second formula above and controls the amount of fuel injected to compensate for fuel deposited on intake component surfaces, which is subsequently vaporized and mixed with air during injection cycles.

It will be readily appreciated that the above description of the best mode of practicing the invention is presented by way of example and not by way of limitation. The spirit and broad scope of the applicant's invention should be construed by reference to the following claims.

I claim:

1. A method for controlling a fuel injection system of an internal combustion engine, said injection system including a microprocessor adapted to respond to engine speed, intake manifold pressure, mass air flow and charge temperature, the method comprising the steps of:

determining puddle fuel vapor pressure and generating a puddle fuel vapor pressure signal representative thereof;

determining air charge temperature and generating an air charge temperature signal representative thereof;

determining engine air mass flow and generating an engine air mass flow signal representative thereof;

determining fuel wetted area characteristic diameter signal representative thereof;

determining manifold pressure and generating a manifold pressure signal representative thereof;

determining engine speed and generating an engine speed signal representative thereof;

calculating, from the data represented by the puddle fuel vapor pressure signal, the air charge temperature signal, the engine air mass flow signal, the fuel wetted area characteristic diameter signal, the fuel wetted area characteristic length signal, the manifold pressure signal, and the engine speed signal, convective fuel vapor flow mass according to the following formula stored in a memory portion of said microprocessor:

$$\frac{(0.0050166 * VAP * \sqrt{ACT} * AM)}{(D * L * PMAN * N)}$$

where:
VAP = puddle fuel vapor pressure (in PSI)
ACT = air charge temperature (in °R.)
AM = engine air mass flow (in pounds per second)
D = fuel wetted area characteristic diameter (in feet)
L = fuel wetted area characteristic length (in feet)
PMAN = manifold pressure (in inches of Hg)
N = engine speed (in RPM), determining injected fuel flow mass rate and generating an injected fuel flow mass rate signal representative thereof;

determining puddle fuel temperature and generating a puddle fuel temperature signal representative thereof;

calculating conductive fuel vaporization rate according to the following formula:

$$\dot{M}_f * VAPFAC$$

where:
$\dot{M}_f$ = injected fuel flow mass rate
$T_f$ = puddle fuel temperature (in °F.)
VAPFAC = 0.002 for $T_f \leq 0$
VAPFAC = 0.0021*$T_f$ for $0 < T_f < 200$
VAPFAC = 0.003625*$T_f$ − 0.305 for $200 < T_f < 400$; and controlling the amount of fuel injected accordingly to compensate for fuel deposited on intake component surfaces and subsequently vaporized and mixed with air during injection cycles.

2. A method for controlling a fuel injection system of an internal combustion engine to regulate fuel delivery to a fuel/air mixture intake port in an intake manifold for said engine, said injection system including a microprocessor adapted to respond to engine speed, manifold pressure, mass air flow and charge temperature, an air charge temperature sensor in said intake manifold, an air mass flow sensor in said intake manifold, and a manifold pressure sensor in said intake manifold, the method comprising the steps of:

determining puddle fuel vapor pressure for liquid fuel delivered to said intake port and generating a puddle fuel vapor pressure signal representative thereof;

determining air charge temperature for combustion air delivered to said intake port and generating an air charge temperature signal representative thereof;

determining engine air mass flow of combustion air delivered to said intake port and generating an engine air mass flow signal representative thereof;

determining fuel wetted area of said intake port and generating a fuel wetted area characteristic diameter signal representative thereof;

determining intake manifold pressure and generating an intake manifold pressure signal representative thereof;

determining engine speed and generating an engine speed signal representative thereof;

calculating convective fuel vapor flow mass, using a control algorithm stored in a memory portion of said microprocessor, as a function of said signals represented by the puddle fuel vapor pressure, the air charge temperature, the engine air mass flow, the fuel wetted area characteristic, the manifold pressure, and the engine speed;

determining injected fuel flow mass rate and generating an injected fuel flow mass rate signal representative thereof;

determining fuel temperature of puddle fuel on said wetted area and generating a puddle fuel temperature signal representative thereof;

calculating conductive fuel vaporization rate as a function of said injected fuel mass flow rate signal and said puddle fuel temperature signal; and controlling the amount of fuel injected accordingly to compensate for fuel deposited on intake manifold component surfaces and subsequently vaporized and mixed with air during injection cycles.

* * * * *